United States Patent
Boynton et al.

(12) 
(10) Patent No.: US 6,742,071 B1
(45) Date of Patent: May 25, 2004

(54) REAL-TIME I/O PROCESSOR USED TO IMPLEMENT BUS INTERFACE PROTOCOLS

(75) Inventors: John Boynton, San Diego, CA (US); Scott Swindle, San Diego, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 491 days.

(21) Appl. No.: 09/625,167

(22) Filed: Jul. 25, 2000

(51) Int. Cl.[7] .......................... G06F 13/14; G06F 13/00
(52) U.S. Cl. ..................... 710/305; 710/107; 710/36
(58) Field of Search .................... 710/14, 15, 305, 710/107, 36; 711/167, 202; 717/155; 375/222; 331/2; 713/400

(56) References Cited

U.S. PATENT DOCUMENTS

| | | | | |
|---|---|---|---|---|
| 4,689,740 A | | 8/1987 | Moelands et al. | 364/200 |
| 4,835,491 A | * | 5/1989 | Coster | 331/2 |
| 5,175,820 A | * | 12/1992 | Gephardt | 710/14 |
| 5,559,502 A | | 9/1996 | Schutte | 340/825.21 |
| 5,689,196 A | | 11/1997 | Schutte | 326/86 |
| 5,737,564 A | * | 4/1998 | Shah | 711/202 |
| 5,850,553 A | * | 12/1998 | Schlansker et al. | 717/155 |
| 6,000,037 A | * | 12/1999 | Herbert | 713/400 |
| 6,073,223 A | * | 6/2000 | McAllister et al. | 711/167 |
| 6,192,070 B1 | * | 2/2001 | Poon et al. | 375/222 |
| 6,490,638 B1 | * | 12/2002 | Ha et al. | 710/15 |

FOREIGN PATENT DOCUMENTS

| | | | | |
|---|---|---|---|---|
| WO | WO 96/17305 | 6/1996 | | G06F/13/40 |
| WO | WO 98/34376 | 8/1998 | | H04L/12/20 |
| WO | WO 99/09712 | 2/1999 | | H04L/12/40 |

* cited by examiner

*Primary Examiner*—Glenn A. Auve
*Assistant Examiner*—Christopher E. Lee
(74) *Attorney, Agent, or Firm*—Christopher P. Maiorana, P.C.

(57) ABSTRACT

A circuit that may be configured to store data and interface with an external device. The circuit may provide one or more control signals to the external device.

17 Claims, 12 Drawing Sheets

(CONVENTIONAL)

FIG. 1

(CONVENTIONAL)

FIG. 2

(CONVENTIONAL)

| OPCODE | INSTRUCTION FORMAT |
|---|---|
| BRANCH ON SIGNAL (BOS) | {n-1BRANCH [X:0], ... 1BRANCH [X:0], 0BRANCH [X:0] LOGIC_CNTL [Y:0], CNTL_OUT [A-1:0], DP_CONTROLS [B-1:0]} |
| WAIT N CLOCKS (WNC) | {INTERVAL_LENGTH [Z:0], CNTL_OUT [A-1:0], DP_CONTROLS [B-1:0]} |

FIG. 11a

| OPCODE | INSTRUCTION FORMAT |
|---|---|
| BRANCH ON SIGNAL (BOS) | {1BRANCH [2:0], 0BRANCH [2:0], LOGIC_CNTL [7:0], CNTL_OUT [5:0], DP_CONTROLS [3:0]} |
| WAIT N CLOCKS (WNC) | {INTERVAL_LENGTH [7:0], CNTL_OUT [5:0], DP_CONTROLS [3:0]} |

FIG. 11b

LOGIC_CNTL [7:0] = {AND_OR_XOR[1:0], INPUT_A[2:0], INPUT_B[2:0]},

WHERE AND_OR_XOR[1:0] MAY SELECT THE LOGIC FUNCTION AS (i) 0: = AND, (ii) 1: =OR, (iii) 2: = XOR AND (iv) 3: = XOR AND INPUT_A[2:0] AND INPUT_B [2:0] SELECT WHICH SIGNALS TO APPLY THE LOGIC FUNCTION TO AS:

| INSTRUCTION | LOGIC CONTROL |
|---|---|
| 0: | EXTERNAL SIGNAL 0, |
| 1: | EXTERNAL SIGNAL 1, |
| 2: | EXTERNAL SIGNAL 2, |
| 3: | EXTERNAL SIGNAL 3, |
| 4: | EXTERNAL SIGNAL 4, |
| 5: | EXTERNAL SIGNAL 5, |
| 6: | INTERNAL SIGNAL FLAG (MAY BE CONNECTED TO A FIFO, IN ONE EXAMPLE) |
| 7: | INTERNAL SIGNAL, WHERE "INTERNAL" AND "EXTERNAL" REFER TO SIGNALS INTERNAL AND EXTERNAL TO THE CHIP |

FIG. 11c

| PROGRAM COUNTER | DATA PATH CONTROL |
|---|---|
| 0. | OUTPUT_SIGNALS = 111111, SEND_INTERRUPT = 0, INCREMENT_ADDRESS = 0, GET_NEW_DATA = 0, DRIVE_DATA_BUS = 0; |
| 1. | OUTPUT_SIGNALS = 111111, SEND_INTERRUPT = 0, INCREMENT_ADDRESS = 0, GET_NEW_DATA = 0, DRIVE_DATA_BUS = 1; |
| 2. | OUTPUT_SIGNALS = 111011, SEND_INTERRUPT = 0, INCREMENT_ADDRESS = 0, GET_NEW_DATA = 0, DRIVE_DATA_BUS = 1; |
| 3. | OUTPUT_SIGNALS = 111111, SEND_INTERRUPT = 0, INCREMENT_ADDRESS = 1, GET_NEW_DATA = 1, DRIVE_DATA_BUS = 0; AND |
| 4. | OUTPUT_SIGNALS = 111111, SEND_INTERRUPT = 0, INCREMENT_ADDRESS = 0, GET_NEW_DATA = 0, DRIVE_DATA_BUS = 0; |

REAL-TIME I/O PROCESSOR USED TO IMPLEMENT BUS INTERFACE PROTOCOLS

FIELD OF THE INVENTION

The present invention relates to a method and/or architecture for implementing bus interface protocols generally and, more particularly, to a method and/or architecture for real-time I/O processor for implementing bus interface protocols.

BACKGROUND OF THE INVENTION

Conventional approaches for implementing bus interfaces are (i) protocol-specific interfaces and (ii) user programmable interfaces. Protocol-specific interfaces allow a circuit to connect to one and only one specific type of interface. Examples of such protocol specific designs are the interface to the P1284 printer parallel bus, EPP interface, ATAPI interface, ISA interface, etc.

Figure 1:
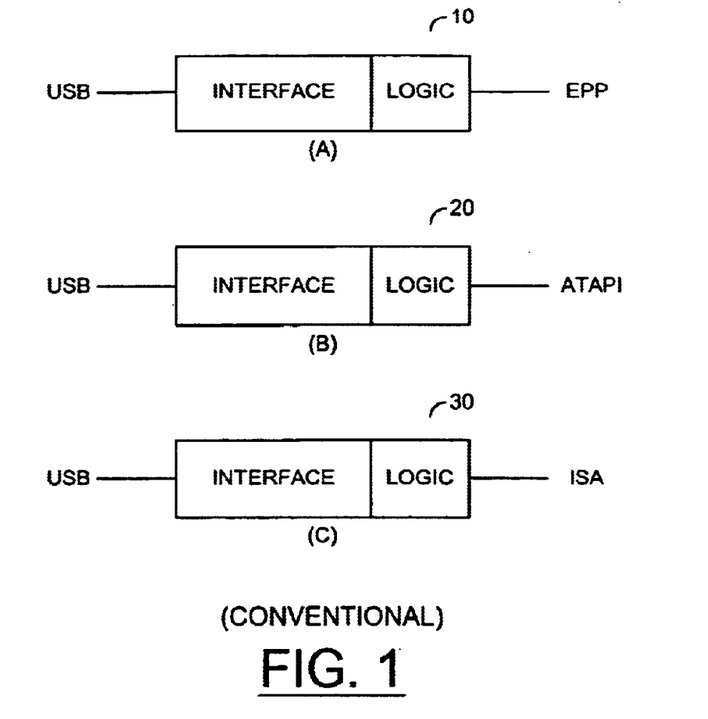

Referring to FIGS. 1a–c, block diagrams of a circuit 10, a circuit 20 and a circuit 30 for implementing a protocol specific approach between a Universal Serial Bus (USB) interface and other specific type interfaces are shown. The circuit 10 is a block diagram illustrating a USB interface to an EPP interface. The circuit 20 is a block diagram illustrating a USB interface to an ATAPI interface. The circuit 30 is a block diagram illustrating a USB interface to an ISA interface. Implementing a separate circuit for each interface is undesirable.

The protocol-specific approaches 10, 20 and 30 are limited to a specific type of interface. The protocol-specific approaches can limit the marketability and relevancy of a product. The inherent lack of flexibility in the protocol-specific approach entails manufacturer risks, since marketing requirements and bus standards can change rapidly.

Conventional user-programmable interfaces allow a user to specify a fixed number of wait-states before attempting to interface with another device. Programming the wait state enables a handshake "ready" signal of the user-programmable interface. User-programmable interfaces require additional intervention (i.e., by the user) and can be difficult to program. Additionally, the user-programmable interfaces do not allow the flexibility, sophistication, or functionality required to implement complex interface signaling, because of the user-programmed fixed number of wait states.

Figure 2:
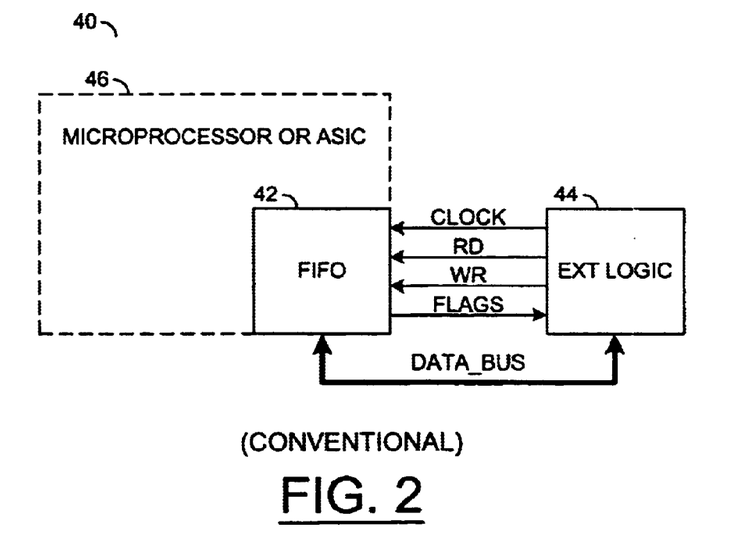
FIG. 2 is a block diagram illustrating a conventional circuit for interconnecting a data resource and an external logic circuit.

Referring to FIG. 2, a circuit 40 illustrating a conventional implementation for interconnecting a data resource 42 to an external logic circuit 44 is shown. The data resource 42 is shown as a FIFO memory. The FIFO 42 can be self-contained or incorporated into an interface circuit (i.e., a microprocessor or an application specific integrated circuit (ASIC)) 46.

Data is transferred between the FIFO 42 and the external logic circuit 44 using a data bus DATA_BUS and a set of control signals CLOCK, RD, WR and FLAGS. The external logic circuit 44 generates the read signal RD and the write signal WR while responding to the flag signal FLAGS. The flag signal FLAGS is generated by the FIFO 42 and indicates a condition of the FIFO 42. For example, the signals FLAGS can indicate that the FIFO 42 is full and cannot be written to or that the FIFO 42 is not empty and can be read. The circuit 40 can implement the read signal RD and the write signal WR as direct data signals, providing an asynchronous interface. Additionally, the circuit 40 can allow the external logic circuit 44 to provide an optional clock signal CLOCK which is enabled in response to the read signal RD and the write signal WR, providing a synchronous interface.

The circuit 40 is a master-slave device arrangement. The master is the external logic circuit 44 and the slave is the data source 42. The master external logic circuit 44 provides the control signals RD and WR and/or optionally CLOCK for the interface circuit 46 and/or the data source 42. Additionally, the master external logic circuit 44 responds to the feedback signal FLAGS. The interface circuit 46 and/or the data source 42 functions as a slave in response to the master external logic circuit 44. The slave interface circuit 46 and/or the data resource 42 responds directly to the signals RD and WR and/or optionally CLOCK received from the master external logic circuit 44.

Figure 3:
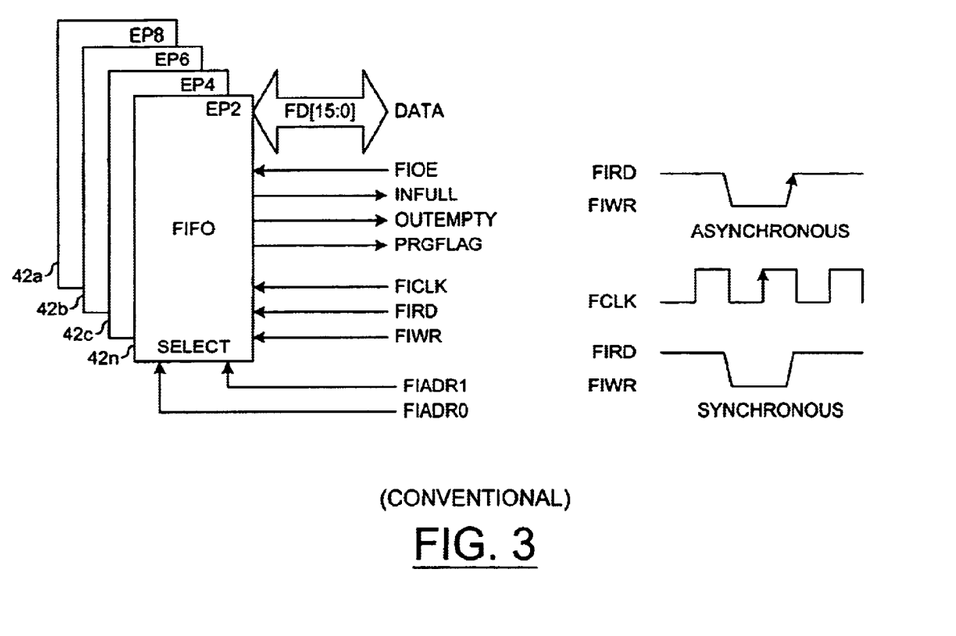
FIG. 3 is a block diagram illustrating a conventional slave implementation of FIFOs.

Referring to FIG. 3, a conventional implementation of four FIFOs 42a–42n embedded in a controller chip is shown. The FIFOs 42a–42n function as conventional slave devices as previously described in connection with the interface circuit 46 and/or the data resource 42 of FIG. 2. The FIFO clock and strobe signals are supplied by a master external interface (i.e., the external logic circuit 44). The conventional slave FIFOs 42a–42n respond directly to the master external logic control signals. Additionally, waveforms illustrating asynchronous and synchronous operation of the conventional slave FIFOs 42a–42n are shown as previously described in connection with FIG. 2.

SUMMARY OF THE INVENTION

One aspect of the present invention concerns a circuit that may be configured to store data and interface with an external device. The circuit may provide one or more control signals to the external device.

Another aspect of the present invention concerns a circuit configured to store data and provide one or more control signals to an external device. At least one of the one or more control signals comprising a programmable clock signal.

Another aspect of the present invention concerns a method for providing a generic interface configured to control an external device comprising the steps of (A) reading an instruction and (B) performing an operation comprising either (i) waiting a predetermined number of clock periods or (ii) branching in response to one or more signals received on a pin.

Another aspect of the present invention concerns a method for providing a generic interface configured to control an external device comprising the steps of (A) receiving a clock signal and (B) progressing to a next state based on a current state and one or more input signals in a single cycle of the clock signal.

The objects, features and advantages of the present invention include providing a method and/or architecture for implementing an interface that may (i) allow a single processor architecture to be implemented for a number of design specific devices, (ii) allow efficient implementation of multiple industry-standard protocols, (iii) allow customer-specific interfaces, (iv) allow a processor-based solution to implement changing and possibly future unknown standards, (v) minimize a risk of interface errors, (vi) control a data source (e.g., a FIFO memory), (vii) develop a set of interface control signals and respond to a set of interface ready signal, (viii) operate at a higher rate (e.g., speed) than standard microprocessor input/output systems, (ix) allow decisions to be made and output to be changed once per clock cycle, (x) be programmable, (xi) be controlled by instructions in a control store, and/or (xii) allow operation to be suspended by interrupting a processor and later resumed by the processor asserting an internal ready signal.

BRIEF DESCRIPTION OF THE DRAWINGS

These and other objects, features and advantages of the present invention will be apparent from the following detailed description and the appended claims and drawings in which:

FIGS. 1(a–c) are block diagrams of conventional interface-to-interface circuits;

FIGS. 11(a–d) are tabulated descriptions of an example of an instruction set implemented for the present invention;

DETAILED DESCRIPTION OF THE PREFERRED EMBODIMENTS

Figure 4:
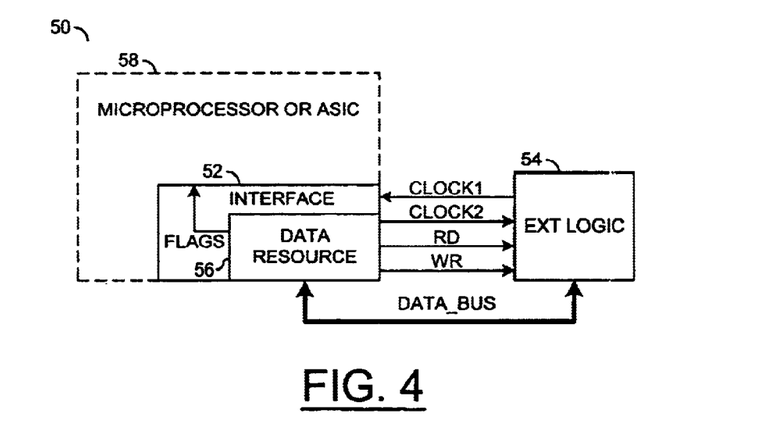
FIG. 4 is a block diagram of a preferred embodiment of the present invention.

Referring to FIG. 4, a block diagram of a circuit (or system) 50 is shown in accordance with a preferred embodiment of the present invention. In some systems it may be advantageous to reverse the master and slave roles as discussed in connection with FIG. 2 of the background section. The system 50 may allow reversal of such conventional master-slave implementations. The system 50 may allow a data reserve implemented with additional logic to control an external device. The system 50 generally comprises a data interface 52 and an external logic block (or circuit) 54. The data interface 52 and the external logic block 54 may communicate through a bus (e.g., DATA_BUS). The data interface 52 generally comprises a data resource 56. In one example, the data interface 52 may be implemented as a FIFO interface and the data resource 56 may be implemented as a FIFO memory. In another example, the data resource 56 may be implemented as a Random Access Memory (RAM) However, the data interface 52 and the data resource 56 may each be implemented as another appropriate type device in order to meet the criteria of a particular implementation.

The data interface 52 may be implemented as a stand-alone system. However, the data interface 52 may be implemented within an interface circuit 58. The interface circuit 58 may be implemented as, in one example, a microprocessor or application specific integrated circuit (ASIC). However, the interface circuit may be implemented as another appropriate type device in order to meet the criteria of a particular implementation. The data interface 52 may receive a clock signal (e.g., CLOCK1), generate a clock signal (e.g., CLOCK2), generate a read signal (e.g., RD) and generate a write signal (e.g., WR). The external logic circuit 54 may generate the signal CLOCK1 and receive the signals CLOCK2, RD and WR. The signals CLOCK1, CLOCK2, RD and WR may be implemented as interface control signals (to be discussed further in connection with FIGS. 5–10). However, a particular number and/or type of interface control signals may be varied in order to meet the criteria of a particular implementation.

The system 50 may allow the data interface 52 to generate (or drive) the interface control signals CLOCK2, RD and WR. The data interface 52 may control the external logic circuit 54. The system 50 may allow the data interface 52 to operate as a master device and the external logic circuit 54 to operate as a slave device. Additionally, the data interface 52 may be required to accommodated (e.g., interface) a number of external circuits. The data interface 52 may be programmable in order to interface a number of appropriate external logic devices.

Since the data interface 52 may be implemented to function as a master device (e.g., driving the interface control signals), the data interface 52 may be implemented as, in one example, a Universal Serial Bus (USB) controller. The USB controller 52 may be expected to connect to a number of diverse interfaces. The USB controller 52 may have a fixed interface function. However, the USB controller 52 may be implemented having a programmable interface function. For example, the USB controller 52 may be programmable such that a number of varying interfaces may be accommodated. Additionally, the USB controller 52 may be required to receive and send data over the Universal Serial Bus and communicate USB data to an external resource (e.g., the external logic circuit 54). The external logic circuit 54 may in turn communicate with another appropriate type device (e.g., a disk drive, printer, network, etc.).

The system 50 may add logic (e.g., the data interface 52) to a data storage element (e.g., the data source 56). The data interface 52 (including additional logic) may allow the data resource 56 to serve as a master device in a system. As a master device, the data resource 56 may provide, rather than responds to, interface control signals such as the read signal RD and the write signal WR.

The system 50 may allow the data interface 52 and/or the data resource 56 to control the external logic circuit 54, thus functioning as a master device. The data interface 52 and/or the data resource 56 may have a fixed function to communicate with various external logic devices. However, the data interface 52 and/or the data resource 56 may have a programmable function to communicate with a number of appropriate external logic devices. Additionally, the external logic circuit 54 may interface with a number of secondary external devices (not shown). The external logic circuit 54 may function as a master device for the secondary external devices. The system 50 may allow the external device to function as a master device (e.g., driving control signals) to any secondary external devices. The system 50 may provide a master logic system that may interface a data resource and connect to an external device.

Figure 5:
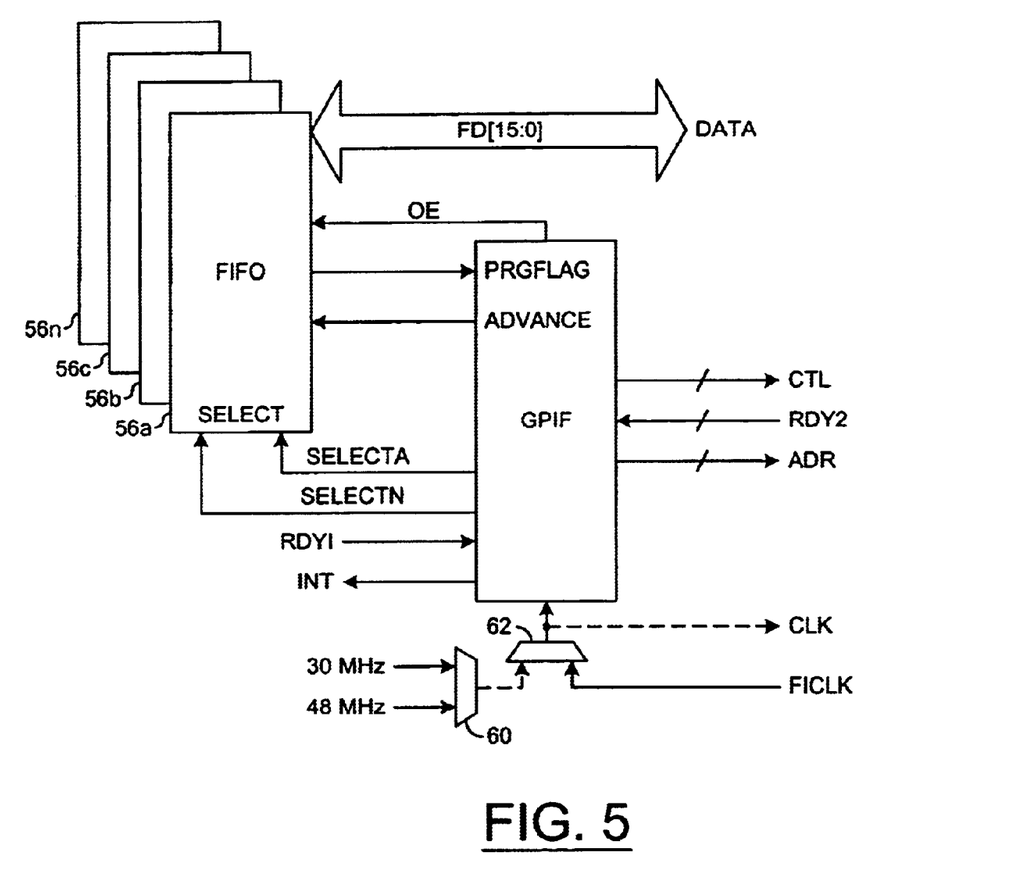
FIG. 5 is a detailed block diagram of the present invention.

Referring to FIG. 5, a detailed block diagram of the interface 52 and the data resource 56 is shown. In one example, the data interface 52 may be implemented as a general purpose interface (GPIF) and the data resource 56 may be implemented as a number of FIFO blocks (or circuits). The GPIF 52 may be implemented to control the FIFOs 56a–56n. The GPIF 52 may be implemented as, in one example, a specialized input-output processor with two instructions. The GPIF 52 may be implemented to generate waveforms for the FIFOs 56a–56n and to wait for external events. Additionally, the GPIF 52 may develop a set of interface control signals in response to a set of interface ready signals.

The GPIF 52 may present a signal (e.g., ADVANCE), a number of signals (e.g., SELECTa–SELCTn), a signal (e.g., OE) and receive a signal (e.g., PRGFLAG) to/from the FIFOs 56a–56n. In one example, the signal ADVANCE may be implemented as an advance clock signal, the signals SELECTa–SELECTn may be implemented as selection signals, the signal PRGFLAG may be implemented as a programmable flag signal and the signal OE may be implemented as an output enable signal. The signals ADVANCE, SELECTa–SELECTn and OE may control operation of the FIFOs 56a–56n. The GPIF 52 may provide further control between the FIFOs 56a–56n by implementing the selection signals SELECTa–SELECTn. The signals SELECTa–SELECTn may be implemented as, in another example, FIFO select signals. The FIFO select signals SELECTa–SELECTn may select one of the FIFOs 56a–56n to store current data.

The GPIF 52 may generate an interrupt signal (e.g., INT), a number of signals (e.g., CTL) and a number of signals (e.g., ADR) that may be presented to the external logic circuit 54. The signals CTL may be implemented as programmable control signals. The control signals CTL may be implemented to control the external logic device 54. The signals ADR may be implemented as a multi-bit address bus that may be incremented on any cycle of the GPIF 52. Additionally, the GPIF 52 may receive a ready signal (e.g., RDY1), a number of ready signals (e.g., RDY2) and a clock signal CLK. In one example, the ready signal RDY1 may be implemented as an internal processor ready signal and the ready signals RDY2 may be implemented as external ready signals.

The GPIF 52 may be implemented as, in one example, a specialized input-output processor with two instructions. The GPIF 52 may be implemented to generate waveforms (via the signal ADVANCE) and wait for external events (via the signal RDY2). The GPIF 52 may clock the FIFOs 56a–56n with the signal ADVANCE. Additionally, the GPIF 52 may initiate an interrupt of a processor (via the signal INT) and resume normal operation in response to the processor (via the signal RDY1). The interrupt signal INT and the ready signal RDY1 may allow an external processor to perform operations in the middle of, and synchronized to, a GPIF clock waveform.

FIFO control signals (e.g., the signals ADVANCE, OE, and SELECTa–SELECTn) may be directly generated by the GPIF 52, rather than by the external logic circuit 54 as described in the background section. The GPIF 52 may act as a master device to the external logic circuit 54. External control signals (e.g., the signals CTL, ADR and INT) may be generated by the GPIF 52 and presented to the external logic circuit 54. The GPIF 52 may drive the external logic circuit 54. The GPIF 52 may control the FIFOs 56a–56n and provide a master interface to the external logic block 54.

The GPIF 52 may be internally clocked from one of two clock sources (e.g., 30 or 48 MHz), or externally clocked by a clock signal (e.g., FLCLK) via a multiplexer 60 and/or a multiplexer 62. Additionally, the clock signal presented to the GPIF 52 may also be optionally presented to the external logic block 54 via a signal (e.g., CLK).

The GPIF 52 may operate at a higher rate (e.g., speed) than standard microprocessor input/output systems. The GPIF 52 may allow multiple decisions to be made and outputs to be changed once per clock, where a conventional processor would require many cycles/clocks. The GPIF 52 may be controlled by a function block (via a logic function, to be discussed in connection with FIG. 6). Alternatively, the GPIF 52 may be programmable (via a write control store, to be discussed in connection with FIG. 7). Additionally, operation of the GPIF 52 may be suspended by interrupting a microprocessor (via the signal INT) and later resumed by the microprocessor asserting an internal ready signal (via the signal RDY1) thus providing a "hook" into another process.

Figure 6:
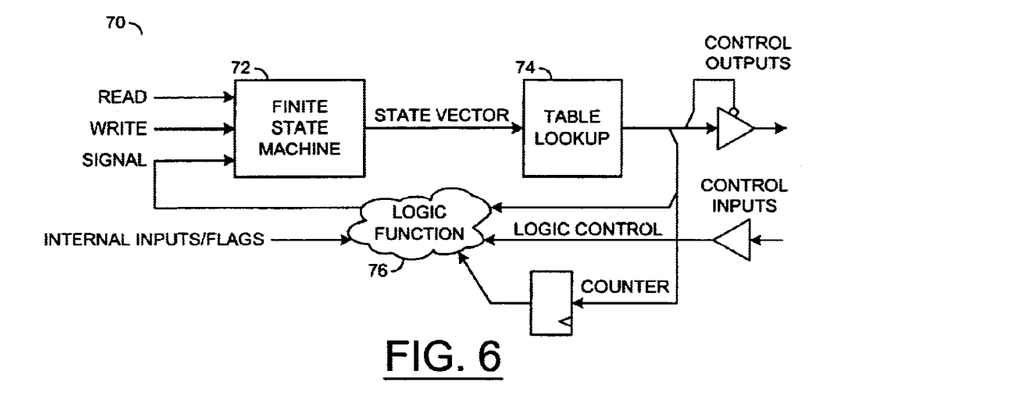
FIG. 6 is a detailed block diagram of the GPIF of FIG. 5.
Figure 7:
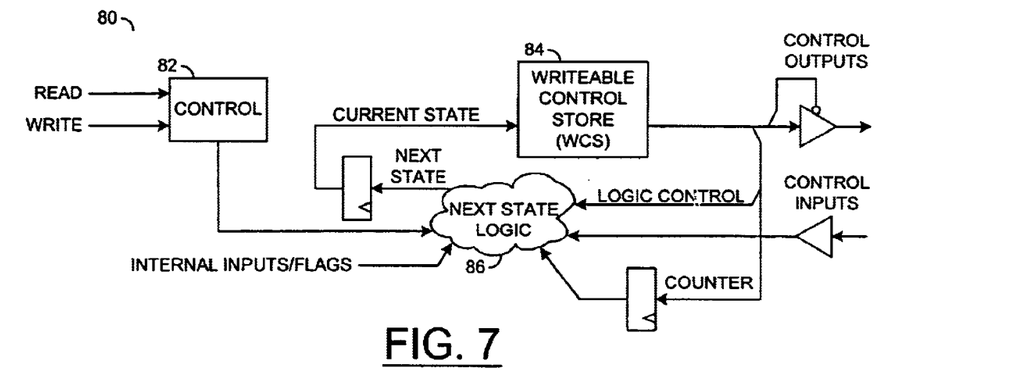
FIG. 7 is an alternate detailed block diagram of the GPIF of FIG. 5.

Referring to FIGS. 6 and 7, implementations of the GPIF 52 are shown. Referring to FIG. 6, a block diagram of a circuit 70 is shown. The circuit 70 may receive a read signal (e.g., READ), a write signal (e.g., WRITE), an internal signal (e.g., INTERNAL_INPUTS/FLAGS), a number of signals (e.g., CONTROL_INPUTS), and present a number of signals (e.g., CONTROL_OUTPUTS). The circuit 70 generally comprising a finite state machine 72, a lookup table 74 and a logic function block (or circuit) 76. The circuit 70 may illustrate a logic function architecture of the GPIF 52.

Referring to FIG. 7, a block diagram of a circuit 80 is shown. The circuit 80 may receive a read signal (e.g., READ), a write signal (e.g., WRITE), an internal signal (e.g., INTERNAL_INPUTS/FLAGS), a number of signals (e.g., CONTROL_INPUTS), and present a number of signals (e.g., CONTROL_OUTPUTS). The circuit 80 generally comprising a control block (or circuit) 82, a writable control store (WCS) block (or circuit) 84 and a next state logic function block (or circuit) 86. The circuit 80 may illustrate a writeable control store architecture of the GPIF 52.

Figure 8:
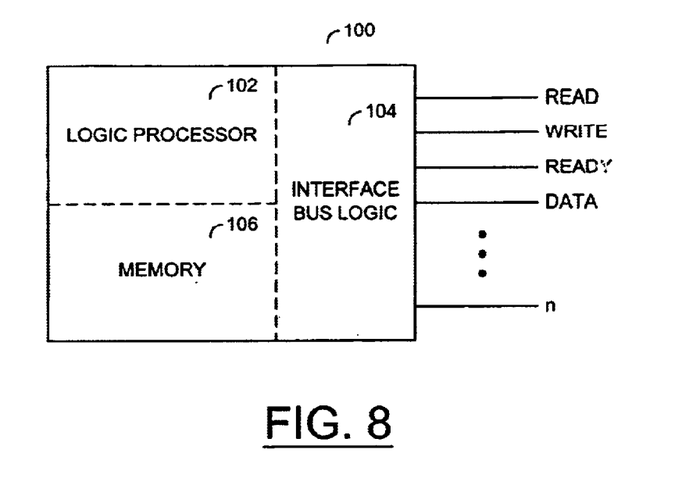
FIG. 8 is a general overview of the present invention.

Referring to FIG. 8, a circuit 100 is shown illustrating a general overview of one variation of the present invention. The structure of the circuit 100 generally comprises a logic processor block (or circuit) 102, an interface bus logic block (or circuit) 104, and a memory block (or circuit) 106. The circuit 100 may be implemented, in one example, as a generic interface. The circuit 100 may receive/present standard or custom bus interface signals. The logic processor circuit 102 may present/receive signals to/from the interface bus logic circuit 104 and present/receive signals to/from the memory 106. The processor 102 may control the interface 100. Additionally, the interface 100 may be implemented to convert between input interface and output interface protocols (to be described in more detail in connection with FIG. 9).

Figure 9:
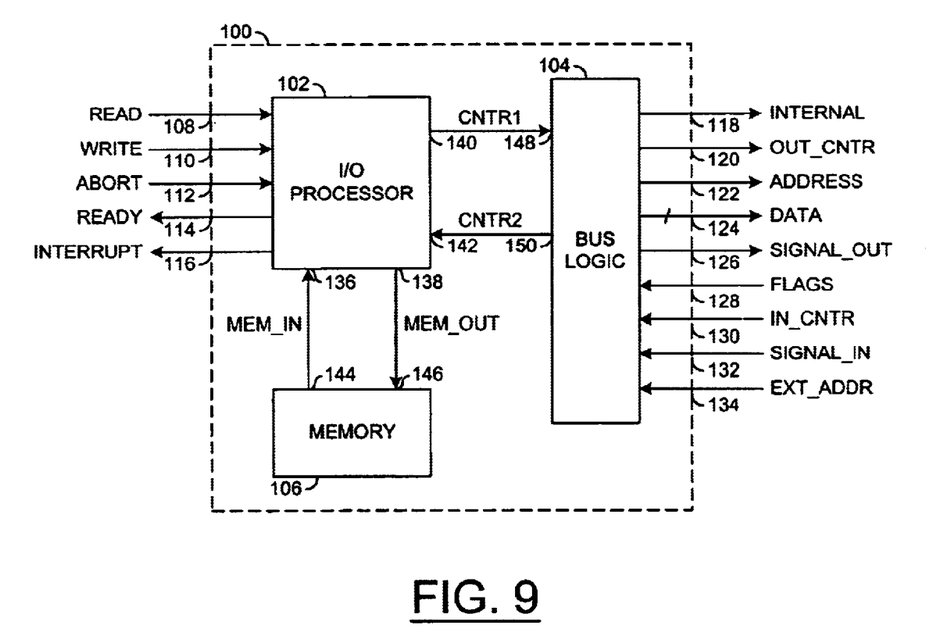
FIG. 9 is a detailed block diagram of the present invention.

Referring to FIG. 9, a more detailed block diagram of the circuit 100 is shown. The circuit 100 generally comprises a first circuit (e.g., the processor) 102, a second circuit (e.g., the bus logic) 104, and a third circuit (e.g., the memory) 106. The circuits 102, 104 and 106, or a subset thereof, may be implemented on a single device. However, the circuits 102, 104 and 106 may be implemented in another appropriate configuration in order to meet the criteria of a particular implementation. The processor 102 may have an input 108 that may receive a signal (e.g., READ), an input 110 that may receive a signal (e.g., WRITE), an input 112 that may receive a signal (e.g., ABORT), an output 114 that may present a signal (e.g., READY) and an output 116 that may present a signal (e.g., INTERRUPT).

The bus logic block 104 may have an output 118 that may present a signal (e.g., INTERNAL), an output 120 that may present a signal (e.g., OUT_CNTR), an output 122 that may present a signal (e.g., ADDRESS), an output 124 that may present a signal (e.g., DATA), an output 126 that may present a signal (e.g., SIGNAL_OUT), an input 128 that may receive a signal (e.g., FLAGS), an input 130 that may receive a signal (e.g., IN_CNTR), an input 132 that may receive a signal (e.g., SIGNAL_IN), and an input 134 that may receive a signal (e.g., EXT_ADDR). In one example, the signal SIGNAL_OUT may be implemented as an inbound data signal and the signal SIGNAL_IN may be implemented as an outbound data signal. Each of the signals received at the inputs 108–134 may be implemented as standard and/or custom bus interface signals.

Additionally, the processor 102 may have an input 136 that may receive a signal (e.g., MEM_IN), an output 138 that may present a signal (e.g., MEM_OUT), an output 140 that may present a signal (e.g., CNTR1), and an input 142 that may receive a signal (e.g., CNTR2). The processor 102 may be implemented, in one example, as a microcontroller. The memory 106 may have an output 144 that may present the signal MEM_IN and an input that may receive the signal MEM_OUT. The signal MEM_OUT may configure the circuit 100 to operate within the parameters of a particular bus interface protocol. The signal MEM_IN may provide information that may allow the memory 106 to configure the signal MEM_OUT to select a particular bus interface protocol.

The bus logic block 104 may have an input that may receive the signal CNTR1 and an output that may present the signal CNTR2. In one example, the signals CNTR1 and CNTR2 may control driving of data through the circuit 100. The processor 102 may generate the various signals of the circuit 100 in response to the signal CNTR2. Additionally, the processor 102 may generate the various signals of the circuit 100 in response to the signals MEM_IN, READ, WRITE and ABORT.

The memory 106 may be implemented as any particular type of memory in order to meet the criteria of a particular implementation. For example, the memory 106 may be implemented as a Programmable Read Only Memory (PROM) or a look up table. In one example, the memory 106 may comprise a user programmable instruction set. The user programmable instruction set may allow for a particular methodology to program (or configure) the circuit 100. Additionally, the signals MEM_IN and MEM_OUT may be implemented as programmable signals.

The circuit 100 may provide a user-programmable bus protocol interface. The programmable signals MEM_IN and MEM_OUT, may allow (i) a number of general purpose handshake signals, (ii) local bus mastering of different industry standard interface bus protocols (e.g., EIDE/ATAPI, IEEE P1284, etc.) and/or (iii) user-custom interface bus protocols to be implemented. Bus transactions of the bus logic block 104 may be programmed for a number of intervals based on a particular clock cycle (via the signal CNTR1) During a particular interval, a data bus (e.g., the signal DATA) of the bus logic 104 may be programmed to wait in an idle state or perform an operation. For example, the bus logic 104 may be configured to (i) sample or not sample, (ii) branch to an address, (iii) perform a logical AND, (iv) perform a logical OR and/or (v) perform a logical XOR on input signals. In one example, the bus logic circuit 104 may be connected to FIFO buffers (not shown) internal to the processor 102. The FIFO buffers may provide rate matching and signal flow control.

Figure 10:
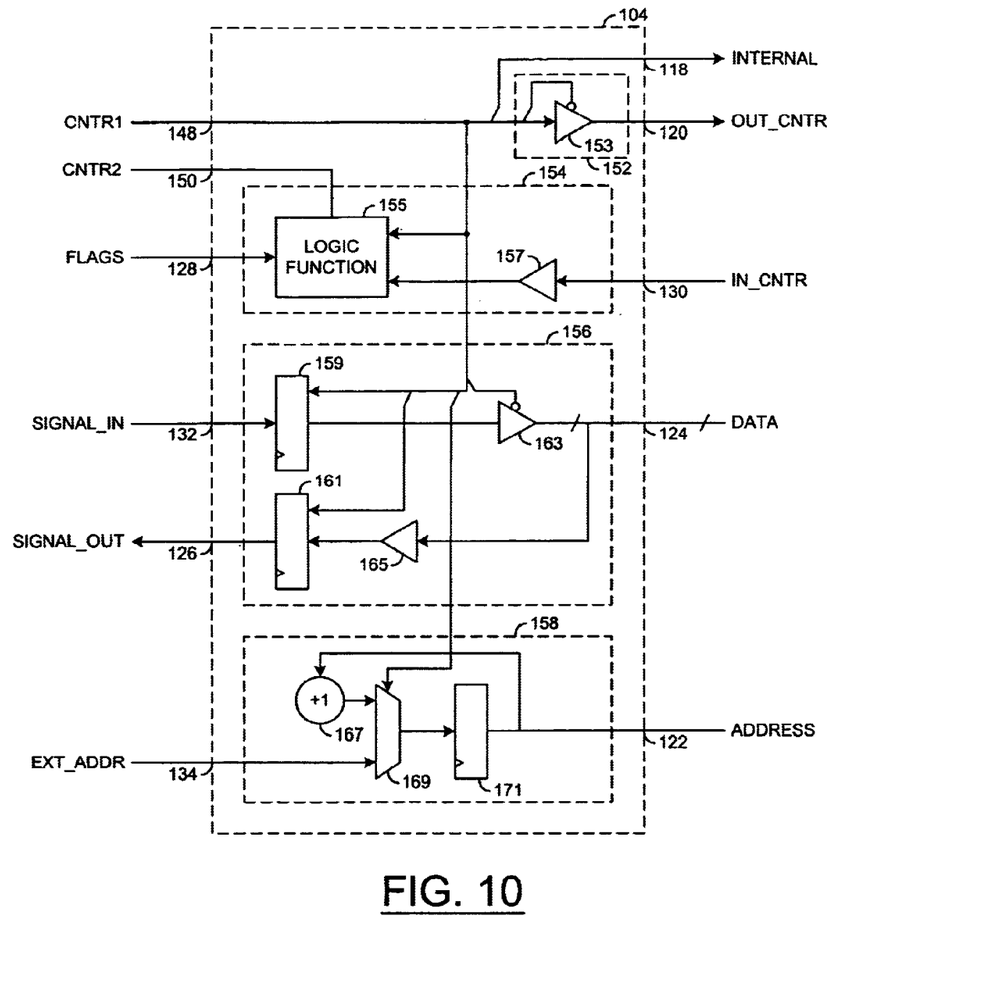
FIG. 10 is a detailed block diagram of a bus logic block of FIG. 9.

Referring to FIG. 10, a detailed block diagram of the circuit bus logic 104 is shown. The structure of the circuit 104 may comprise a section 152, a section 154, a section 156, and a section 158. The section 152 may be implemented as a buffer 153. In one example, the section 154 may be implemented as a logic gate 155 and a buffer 157, the section 156 may be implemented as a flip-flop 159, a flip-flop 161, a buffer 163 and a buffer 165 and the section 158 may be implemented as a counter 167, a multiplexer 169, and a flip-flop 171. However, a particular implementation of the sections 152, 154, 156, and 158 may be varied accordingly to meet the design criteria of a particular implementation.

Figure 11A:
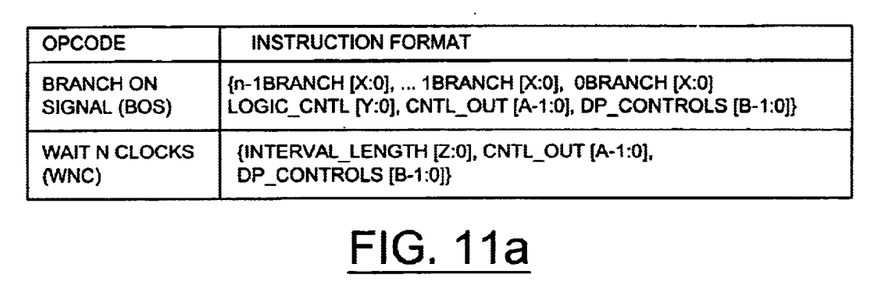
Figure 11B:
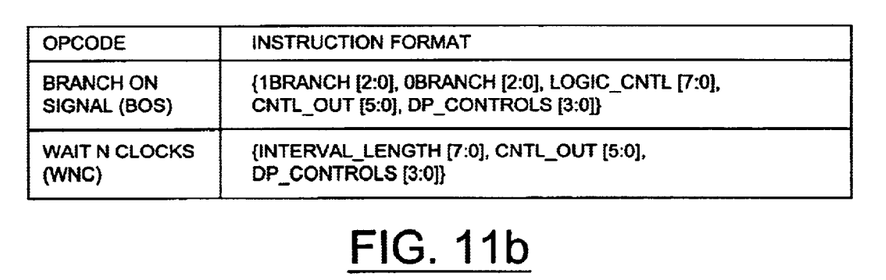

Referring to FIGS. 11(a)–11(b), the specialized processor contains two instructions, one to cause variable-time transitions on a set of control outputs, and the other to wait for external events before proceeding. The instructions may be controlled by an input pin and/or signal.

Referring to FIG. 11a, an example implementation of an instruction set (e.g., OPCODE) stored in the memory 106 is shown. The instruction set may comprise, in one example, two instructions (i) a "branch on signal" (BOS) instruction, and (ii) a "wait N clocks" (WNC) instruction.

The signal BOS may allow n-way branching by specifying the next instruction to be executed. The signal BOS may be a log2 (n)—bit signal which may result from the vector logic_cntl[y:0] being applied to the input logic processor 102.

The signal WNC may hold the processor 102 in the current state for N clocks, where N is an integer. In addition, each instruction generally specifies the instruction {cntl_out[a-1:0], dp_controls[b-1:0]}, where the vector cntl_out [a-1:0] may be an a-bit vector (where a is an integer), which generally defines the external control signals/bits during the instruction. The vector dp_controls[b-1:0] may be a b-bit vector (where b is an integer), which generally defines the internal control signals/bits during the instruction controlling the data path during operation of the circuit 100.

The processor 102 may be in a "reset" state (e.g., an IDLE state) until an I/O operation is required. The I/O operation may be triggered by an assertion of either the signal READ or the signal WRITE. Following the assertion of either the signal READ or the signal WRITE, the processor 102 may execute the appropriate read or write program stored in the memory 106.

Referring to FIG. 11b, a listing of example definitions of the instruction set OPCODE implementing a read or write function is shown. However, other appropriate instruction sets may be implemented accordingly to meet particular design criteria. In one example, the number of branches may be two; the number of instructions (or states) may be seven plus an IDLE state; and the maximum interval length may be 256 clocks. However, other appropriate number of and/or configurations of branches may be implemented in order to meet the criteria of a particular implementation.

The instruction opcodes may be interpreted as follows:

Branch On Signal (BOS)—may allow n-way branching by specifying a next instruction to be executed, where the "signal" is a log2 (n)—bit signal which results from the logic_cntl[y:0] vector being applied to the input logic; and Wait N Clocks (WNC)—may hold the processor in the current state for N clocks.

In addition, each instruction specifies the following:

{cntl_out [a-1:0], dp_controls[b-1:0]}, where cntl_out [a-1:0] is an a-bit vector which may define external control bits during the instruction and dp_controls[b-1:0] is a b-bit vector which may define internal signals controlling the datapath during the operation.

Figure 11C:
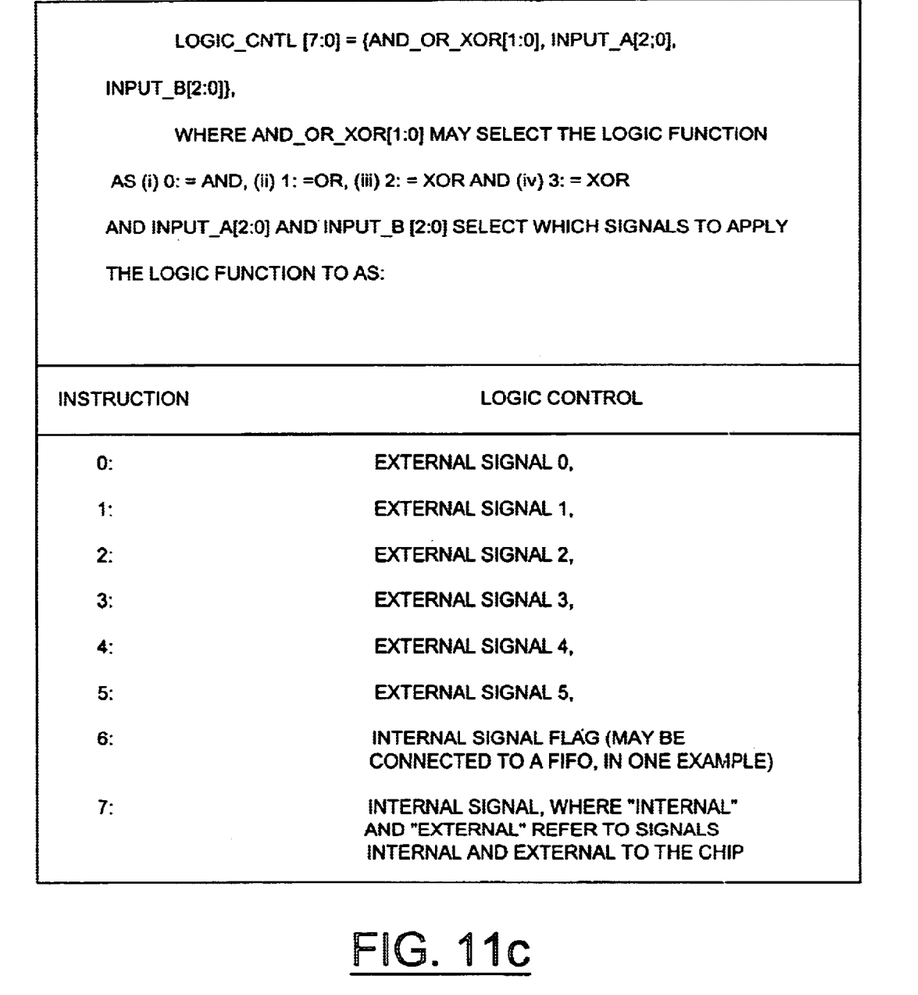

Referring to FIG. 11c, an example of a logic control instruction is shown. An example of the control outputs and data path controls may be defined, in one example, as follows:

{cntl_out[5:0], dp_controls[3:0]}, which defines the state of six output signals and four data path control signals.

An example of the data path control signals may be defined as follows:

dp_controls[3:0]={send_signal, increment_address, get_new-data, drive/sample}, where: send_signal causes the processor to assert a signal during the interval; increment_address causes the address to increment at the beginning of the interval; get_new_data causes new data to be loaded into the output register at the beginning of the interval; and drive/sample specifies driving the bus during the interval for writes and sampling the bus at the beginning of the interval during reads.

Using such definitions, a bus interface may be constructed using a simple program. For example, the bus interface may comprise several intervals where a data bus may be qualified by a strobe signal. A program for a bus write (e.g., to an external SRAM) may be illustrated by the following example:

0. IDLE
1. WNC(10)
2. WNC(20)
3. WNC(10)
4. BOS(IDLE, IDLE, DC), where the signal WNC(n) may be defined as, "wait in this state for n clocks" and the signal BOS(IDLE, IDLE, DC), may be defined as, "branch on signal=1 to the IDLE state, branch on signal=0 to the IDLE state, where the DC indicates that the logic function controlling the signal is generally a 'don't care' since, in this example, both the 0 and 1 branches go to the IDLE state".

Figure 11D:
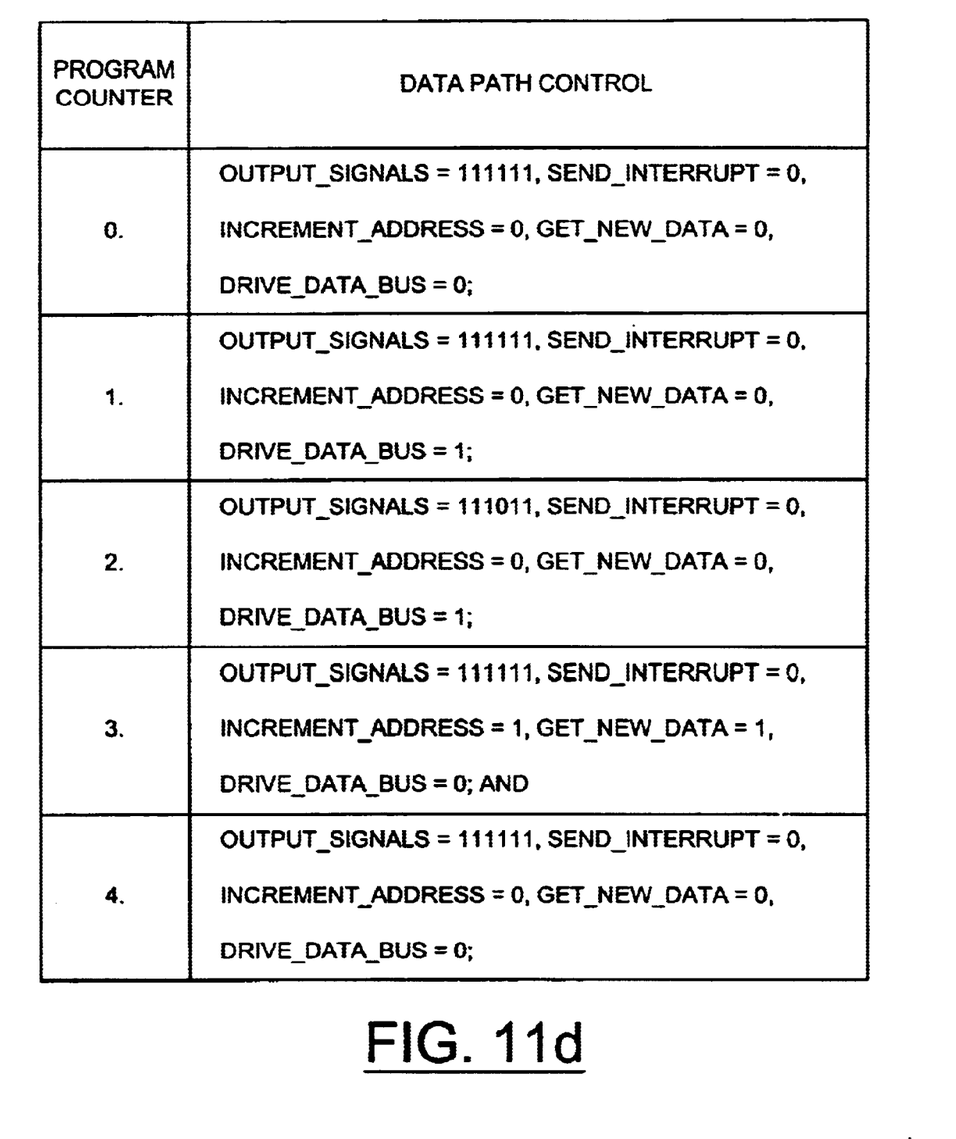

Referring to FIG. 11d, an example of the output and data path controls for each value of a program counter is shown. In one example, a control signal [2] is pulsed low in state 2. The address is generally incremented and new data is generally obtained from the chip at the beginning of state 3. The data bus is generally driven in states 1 and 2.

In one example, an efficient hard real-time I/O processor circuit may implement two instructions to provide a user programmable bus handshake protocol. Such an approach may allow local bus mastering using industry standard protocols such as EIDE/ATAPI and printer parallel port (IEEE P1284). Additionally, the approach may allow the implementation of customer-specific bus interface protocols. While FIGS. 11(a–d) illustrate an example that may define a parallel bus interface, other implementations, including, but not limited to, discrete logic components, may be implemented to meet the design criteria of a particular application.

Figure 12:
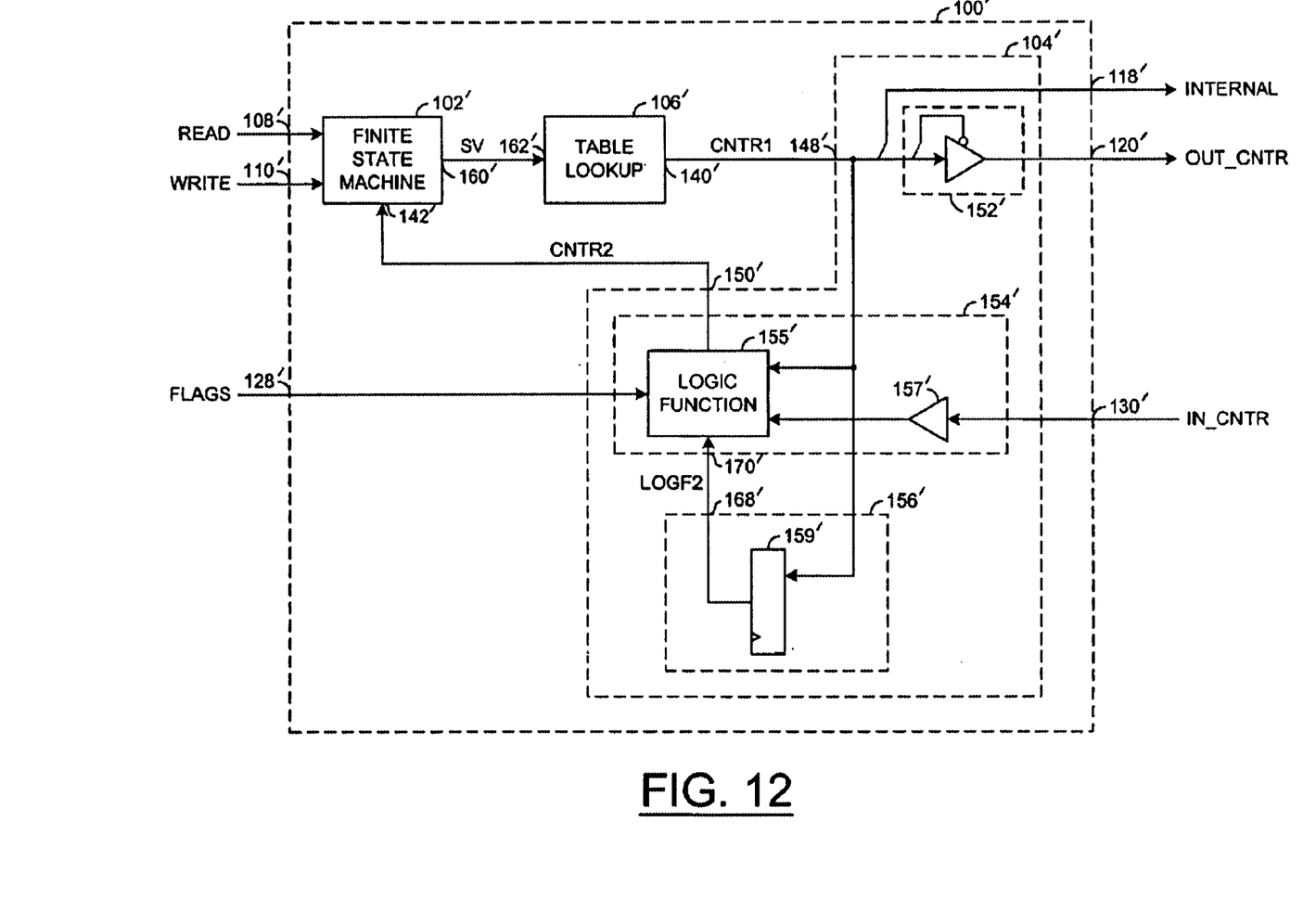
FIG. 12 is a detailed block diagram of an alternate embodiment of the present invention.

Referring to FIG. 12, a detailed block diagram of a circuit 100' illustrating an alternative embodiment of the present invention is shown marked with primed notation. The circuit 100' may be similar to the circuit 100. The circuit 100' may comprise a first circuit 102', a second circuit 104', and a third circuit 106'. The circuit 100' may have an input 108' that may receive the signal READ, an input 110' that may receive the signal WRITE, an output 118' that may present the signal INTERNAL, an output 120' that may present the signal OUT_CNTR, an input 128' that may receive the signal FLAGS, and an input 130' that may receive the signal IN_CNTR. The first circuit 102' may have an input 142' that may receive a signal (e.g., CNTR2) and an output 160 that may present a signal (e.g., SV). In one example, the first circuit 102' may be implemented as a finite state machine and the memory 106' may be implemented as a look up table.

The bus logic block 104' may have a section 152', a section 154', and a section 156'. In one example, the section 156' may be implemented as a counter 159'. The section 154' may be connected between the input 128', the input 130', the input 148', the output 150', and an input 170' that may receive a signal (e.g., LOGF2). The section 156' may be connected between the input 148' and an output 168' that may present the signal LOGF2. The memory 106' may have an output 140' that may present the signal CNTR1 and an input 162' that may receive a signal SV. However, a particular implementation of the sections 152', 154', and 156' may be varied accordingly to meet the design criteria of a particular implementation.

Figure 13:
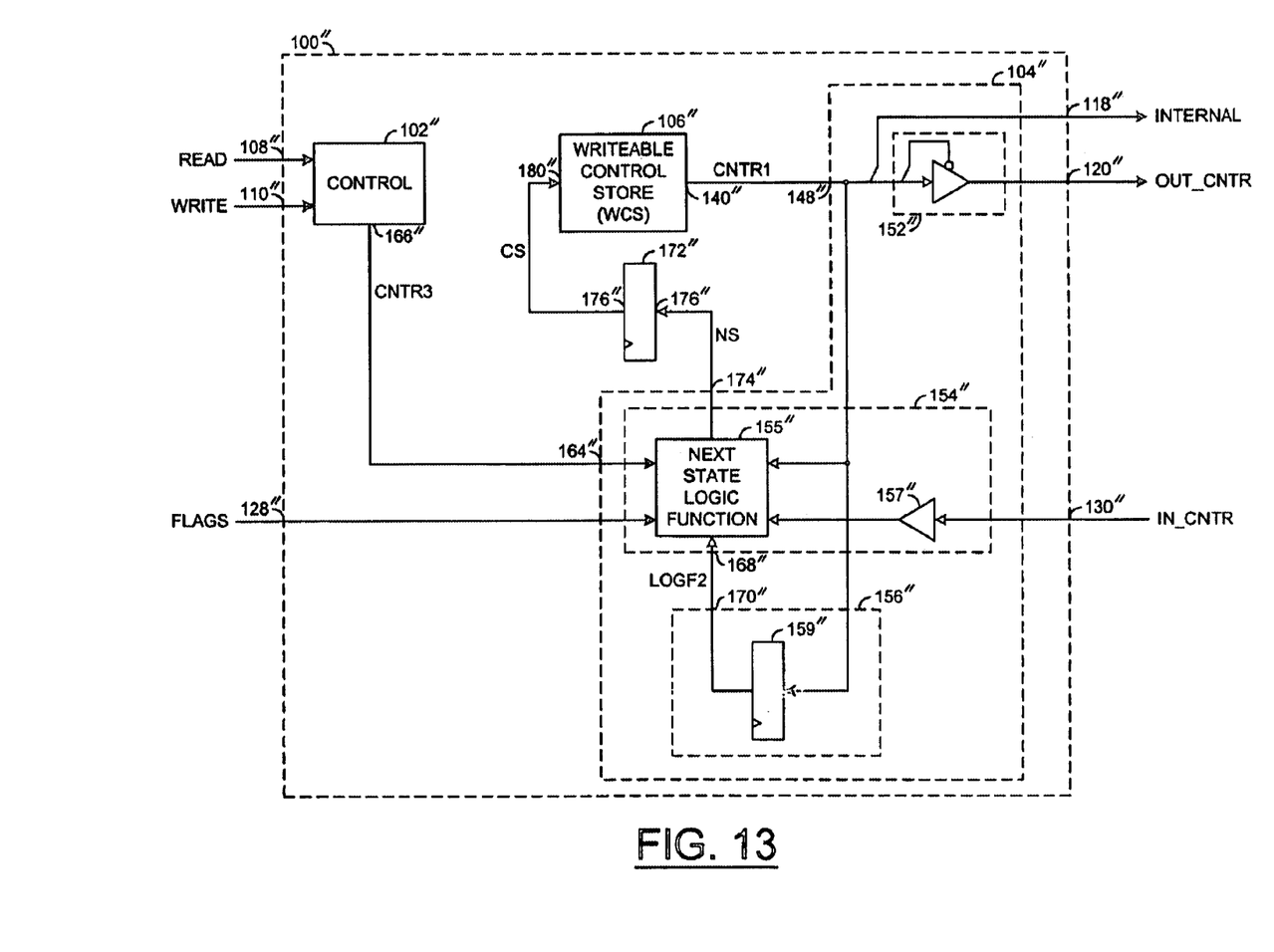
FIG. 13 is a detailed block diagram of another alternate embodiment of the present invention.

Referring to FIG. 13, a detailed block diagram of a circuit 100" illustrating another alternative embodiment of the present invention marked with double primed notation is shown. The circuit 100" may be similar to the circuit 100. The first circuit 102" may have an output 166" that may present a signal (e.g., CNTR3). In one example, the first circuit 102" may be a control state machine. The bus logic block 104" may comprise a section 152", a section 154" and a section 156". In one example, the section 152" may be implemented as a buffer. The section 154" may comprise a logic gate 155" and a buffer 157". The section 156" may comprise a counter 159 . However, the particular implementation of the sections 152", 154", and 156" may be varied accordingly to meet the design criteria of a particular implementation.

The memory 106" may have an output 140" that may present the signal CNTR1 and an input 180 that may receive a signal (e.g., CS). In one example, the memory 106" may be a writeable control store circuit (WCS). The gate 172" may be connected between an input 176" that may receive the signal NS and an output 178" that may present the signal CS. The gate 172" may be, in one example, an incremental register.

Figure 14:
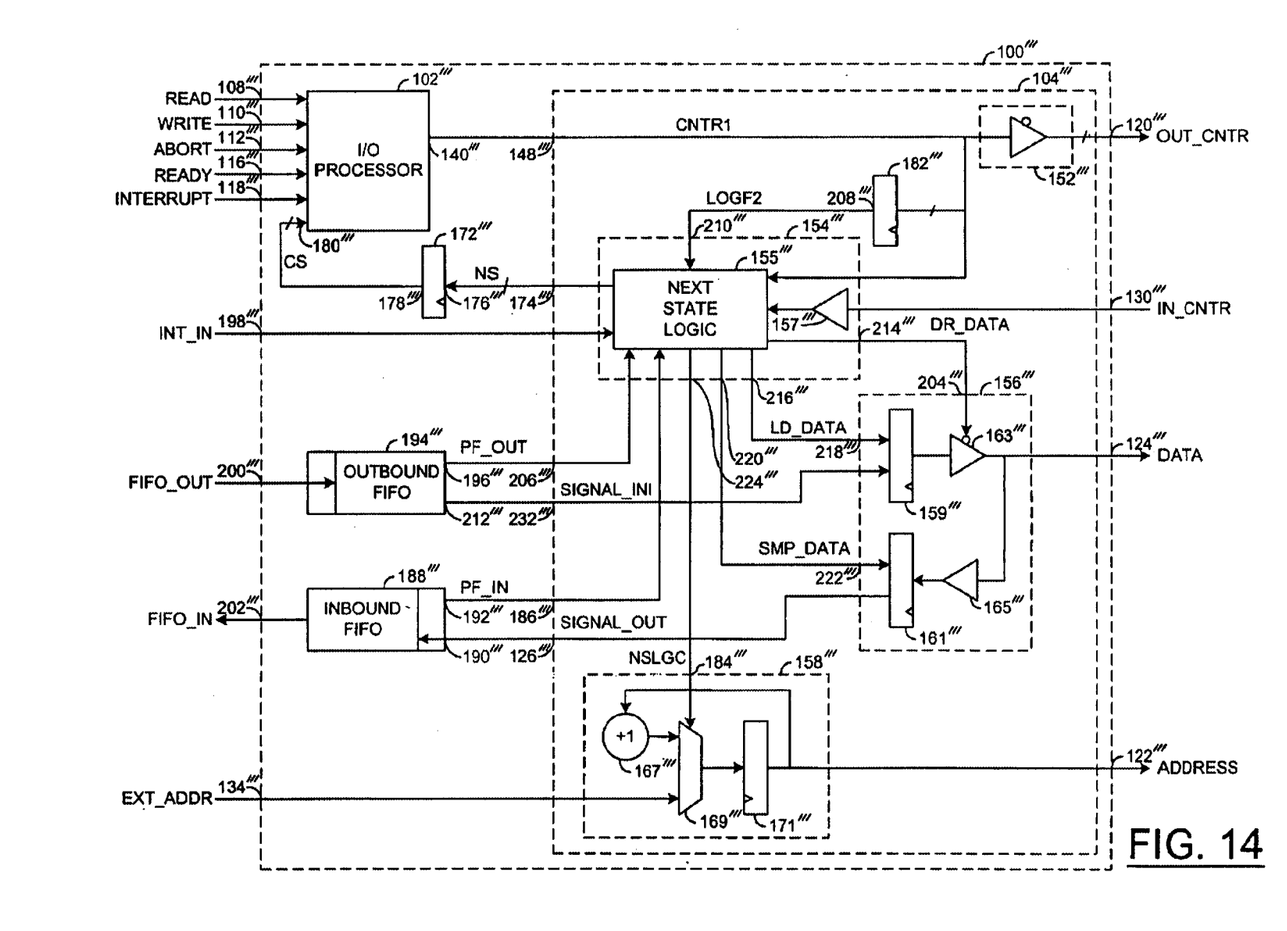
FIG. 14 is a detailed block diagram of another alternate embodiment of the present invention.

Referring to FIG. 14, a detailed block diagram of a circuit 100''' illustrating another alternative embodiment of the present invention marked with triple primed notation is shown. The circuit 100''' may be similar to the circuit 100. The circuit 100''' may have an input 198''' that may receive a signal (e.g., INT_IN), an input 200' that may receive a signal (e.g., FIFO_OUT), and an output 202''' that may present a signal (e.g., FIFO_IN). The first circuit 102''' may have an output 140''' that may present the signal CNTR1 and an input 180''' that may receive the signal CS. The first circuit 102''' may be, in one example, implemented as an I/O processor.

The bus logic block 104''' may have an output 126''' that may present the signal SIGNAL_OUT, an input 132''' that may receive the signal SIGNAL_IN1, an input 148''' that may receive the signal CNTR1, an output 174''' that may present the signal NS, an input 186''' that may receive a signal (e.g., PF_IN) and an input 206''' that may receive a signal (e.g., PF_OUT). The section 154''' may have an output 214''' that may present a signal (e.g., DR_DATA), an output 216''' that may present a signal (e.g., LD_DATA), an output 220''' that may present a signal (e.g., SMP_DATA), and an output 224''' that may present a signal (e.g., NSLGC). The section 154''' may be, in one example, implemented as a next state logic gate. The section 156''' have an input 204''' that may receive the signal DR_DATA, an input 218''' that may receive the signal LD_DATA, and an input 222''' that may receive the signal SMP_DATA. The section 158''' may be connected between the output 122''', the input 134''', and an input 184''' that may receive the signal NSLGC. The gate 182''' may be connected between the input 148''' and an output 208''' that may present the signal LOGF2. A particular implementation of the sections 152''', 154''', 156''', and 158''' may be varied accordingly to meet the design criteria of a particular implementation.

The section 188''' may be connected between an input 190''' that may receive the signal SIGNAL_OUT, an output 192''' that may present the signal PF_IN, and the output 202'''. In one example, the section 188''' may be implemented as an inbound FIFO buffer. The section 194''' may be connected between an output 196''' that may present the signal PF_OUT, the input 200''' and an output 212''' that may present the signal SIGNAL_IN. The section 194''' may be, in one example, implemented as an outbound FIFO buffer.

The circuit 100 (or 100', 100" and 100''') may be configured to handle multiple, rapidly changing bus interface requirements. The circuit 100 may have wide applicability in a broad range of I/O interface components. For example, the circuit 100 may be implemented to connect a Universal Serial Bus (USB) to another industry standard bus, such as EIDE/ATAPI or IEEE P1284. Additionally, the circuit 100 may allow for conversion of systems based on older parallel bus protocols to a USB protocol. The flexibility of such an approach may also allow easy adaptation to other custom interfaces.

The circuit 100 may allow efficient implementation of multiple industry-standard protocols and customer-specific interfaces with a single circuit implementing a configurable processor. The processor-based solution may allow the circuit 100 to keep pace with changing standards (e.g., programmable bits) and may minimize the risk of logic errors that may plague protocol-specific (or hard-coded) implementations.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
   a memory configured to generate a plurality of first control signals in response to a state signal;
   a first circuit configured to generate said state signal conveying one of a plurality of states in response to a second control signal; and
   an interface circuit configured to (i) interface with an external bus, (ii) drive at least one output control signal of said first control signals onto said external bus, (iii) generate said second control signal in response to both an input signal received from said external bus and at least one internal control signal of said first control signals and (iv) generate a signal in response to at least one of said first control signals.

2. The circuit according to claim 1, wherein said interface circuit comprises a logic circuit configured to generate said second control signal in response to said signal.

3. The circuit according to claim 1, wherein said first circuit comprises a state machine.

4. The circuit according to claim 1, wherein said memory is configured as a lookup table.

5. The circuit according to claim 1, wherein said first circuit is responsive to a read signal.

6. The circuit according to claim 5, wherein said first circuit is responsive to a write signal.

7. The circuit according to claim 6, wherein at least one of said first control signals comprises a clock signal.

8. The circuit according to claim 1, wherein said interface circuit is further configured to generate said second control signal in response to a flag signal.

9. A circuit comprising:
   a memory configured to generate a plurality of first control signals in response to a state signal;
   a first circuit configured to generate a second control signal in response to at least one of a read signal and a write signal; and
   an interface circuit configured to (i) interface to an external bus, (ii) drive at least one output control signal of said first control signals to said external bus, (iii) generate said state signal conveying one of a plurality of states in response to (a) at least one internal control signal of said first control signals, (b) said second control signal and (c) an input signal received from said external bus and (iv) generate a signal in response to at least one of said first control signals.

10. The circuit according to claim 11, wherein said interface circuit is further configured to generate said state signal in response to a flag signal.

11. The circuit according to claim 9, wherein said interface circuit comprises a logic circuit configured to generate said state signal in response to said signal.

12. The circuit according to claim 9, wherein (i) a first at least one of said first control signals comprise a read signal, (ii) a second at least one of said first control signals comprise a write signal and (iii) a third at least one of said first control signals comprise a clock signal.

13. A method for providing an interface to an external bus, comprising the steps of:
   (A) executing an instruction defining a plurality of first control signals in response to a current state of a plurality of states;
   (B) driving at least one output control signal of said first control signals onto said external bus while (i) waiting a predetermined number of clock periods defined by a wait type of said instruction and (ii) branching to a next instruction defined by a branch type of said instruction comprising a plurality of branch conditions;
   (C) generating a second control signal in response both to an input signal received from said external bus and at least one internal control signal of said first control signals; and
   (D) updating said current state in response to said second control signal.

14. The method according to claim 13, wherein said branch type of said instruction further comprises a first input signal, a second input signal and a logical function for operating on said first input signal and said second input signal.

15. A method for providing an interface to an external bus, comprising the steps of:
   (A) generating a plurality of first control signals in response to a current state of a processor;

(B) progressing to a next state based on said current state, at least one internal control signal of said first control signals and an input signal received from said external bus;

(C) driving at least one output control signal of said first controls signals onto said external bus; and (D) updating said current state to said next state.

16. The method according to claim 15, further comprising the step of generating a signal to control a data direction on said external bus.

17. The method according to claim 15, further comprising the step of generating a signal to enable incrementing an address presented to said external bus.

* * * * *